US007852710B2

(12) United States Patent
Kelly et al.

(10) Patent No.: US 7,852,710 B2
(45) Date of Patent: Dec. 14, 2010

(54) TIDE DISPLAY DEVICE WITH GLOBAL POSITIONING SYSTEM, TIMING AND NAVIGATION (75) Inventors: Sean Kelly, Aliso Viejo, CA (US); Alain Marhic, Bidart (FR); Xaiver Faucher, Angresse (FR); Jeff Rowley, Jan Juc (AU)

(73) Assignee: Quiksilver, Inc., Huntington Beach, CA (US)

( * ) Notice: Subject to any disclaimer, the term of this patent is extended or adjusted under 35 U.S.C. 154(b) by 0 days.

(21) Appl. No.: 11/853,580

(22) Filed: Sep. 11, 2007

(65) Prior Publication Data
US 2008/0062819 A1 Mar. 13, 2008

Related U.S. Application Data (60) Provisional application No. 60/844,070, filed on Sep. 11, 2006.

(51) Int. Cl.
G04B 47/00 (2006.01)
G04B 19/26 (2006.01)
(52) U.S. Cl. .............................. 368/16; 368/10; 368/19; 368/20
(58) Field of Classification Search .................. 368/10, 368/11, 15–20, 47, 82, 223, 239; 702/2–5
See application file for complete search history.

(56) References Cited

U.S. PATENT DOCUMENTS

| 3,899,668 | A | 8/1975 | Tucker, Jr. |
| 4,412,749 | A | 11/1983 | Showalter |
| 5,115,417 | A | 5/1992 | Saunders |
| 5,293,355 | A | 3/1994 | Widen et al. |
| 5,299,126 | A | 3/1994 | Spraker |
| 5,347,497 | A | 9/1994 | Allen |
| 5,363,307 | A | 11/1994 | Yoshida |
| 5,440,559 | A * | 8/1995 | Gaskill ................. 370/314 |
| 5,579,289 | A | 11/1996 | Kerr |
| 6,226,594 | B1 | 5/2001 | Nakamura |
| 6,295,248 | B1 | 9/2001 | Nakamura |
| 6,907,582 | B2 * | 6/2005 | Stanley ................. 715/866 |
| 7,230,883 | B2 | 6/2007 | Marhic et al. |
| 2003/0033087 | A1 | 2/2003 | Yuzuki |

(Continued)

FOREIGN PATENT DOCUMENTS

EP 1283454 2/2003

(Continued)

OTHER PUBLICATIONS www.onlynixonwatches.com, The Nixon Lowdown Tide Watch, Mar. 2, 2007.

(Continued)

Primary Examiner—Vit W Miska
(74) Attorney, Agent, or Firm—Snell & Wilmer L.L.P.

(57) ABSTRACT

A global positioning system (GPS) receiver may be integrated with a tide display device. The GPS receiver receives satellite signals and determines the precise time and geodetic position by trilateration. The precise time and geodetic position is used by the tide display device to determine the appropriate tide information to display. The tide display device displays the tide information to a surfer on a graph display with the ordinate axis representing tide height and the abscissa axis representing time.

14 Claims, 5 Drawing Sheets

U.S. PATENT DOCUMENTS

| | | | |
|---|---|---|---|
| 2003/0058287 A1* | 3/2003 | Stanley | 345/864 |
| 2003/0103413 A1* | 6/2003 | Jacobi et al. | 368/10 |
| 2003/0167124 A1 | 9/2003 | Bowden | |
| 2004/0233788 A1 | 11/2004 | Plancon et al. | |
| 2005/0013199 A1* | 1/2005 | Danks et al. | 368/19 |
| 2005/0190652 A1* | 9/2005 | Marhic et al. | 368/15 |
| 2007/0237033 A1 | 10/2007 | Marhic et al. | |

FOREIGN PATENT DOCUMENTS

| | | |
|---|---|---|
| EP | 1840590 | 10/2007 |
| FR | 2654850 | 5/1991 |
| JP | 200180197 | 6/2000 |

OTHER PUBLICATIONS www.boardco.com, The Nixon Lowdown Tide Watch, pp. 1-2, Mar. 2, 2007.

* cited by examiner

TIDE DISPLAY DEVICE WITH GLOBAL POSITIONING SYSTEM, TIMING AND NAVIGATION

CLAIM OF PRIORITY UNDER 35 U.S.C. §119

The present Application for patent claims priority to Provisional Application No. 60/844,070 entitled "TIDE DISPLAY DEVICE WITH GLOBAL POSITIONING SYSTEM, TIMING AND NAVIGATION," filed on Sep. 11, 2006 and assigned to the assignee hereof and hereby expressly incorporated by reference herein.

BACKGROUND

1. Field

The invention relates generally to display devices. More specifically, the invention relates to portable display devices for displaying tide information.

2. Related Art

Surfers have traditionally relied on various sources for gathering information about surf conditions, for example, the internet, television, and radio. Surf conditions depend on many factors including local bathymetry, swells, wind conditions, and tides. Information related to tides in many local areas has often been scant. Tide tables from the National Oceanographic and Atmospheric Administration (NOAA) provides tide heights for ports and bridges. The information, however, has little utility for surfers interested in the surf conditions at surfing beaches.

Many surfers would like to have tide information available to them while surfing. Some surfers use watches with preloaded tide information. The tide information presented to the surfer on some of these watches includes the present tide height displayed as a numerical value. Other watches show the present tide height by illuminating one of eight, low to high tide bars. These watches, however, do not provide the surfer with complete and precise twenty-four hour tide information.

To use these watches correctly, a surfer must also enter their precise geographic location since relevant tide information depends on the location of the surfer. Complicating matters, the surfer may be unaware of his precise geographic location or the name of the beach he is surfing at. Even if the surfer knows his precise location, his watch may not have tide data for that location because the manufacturer had limited memory for storing preloaded tide data.

Thus, there is a need for a tide display device for surfers that will allow them to determine their precise geodetic location and view precise twenty-four hour tide information for that location.

SUMMARY

A global positioning system (GPS) receiver may be integrated with a tide display device. The GPS receiver receives satellite signals and determines the precise time and geodetic position by trilateration. The precise time and geodetic position is used by the tide display device to determine the appropriate tide information to display. The tide display device displays the tide information to a surfer on a graph display with the ordinate axis representing tide height and the abscissa axis representing time.

BRIEF DESCRIPTION OF THE DRAWINGS

The exact nature of this invention as well as its objects and advantages will be readily understood upon consideration of the following specification as related to the attendant drawings wherein like reference numerals throughout the drawings indicate like parts, and wherein.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "one embodiment" or "an embodiment" in various places in the specification are not necessarily all referring to the same embodiment. Throughout the drawings, reference numbers are re-used to indicate correspondence between referenced elements.

Figure 1:
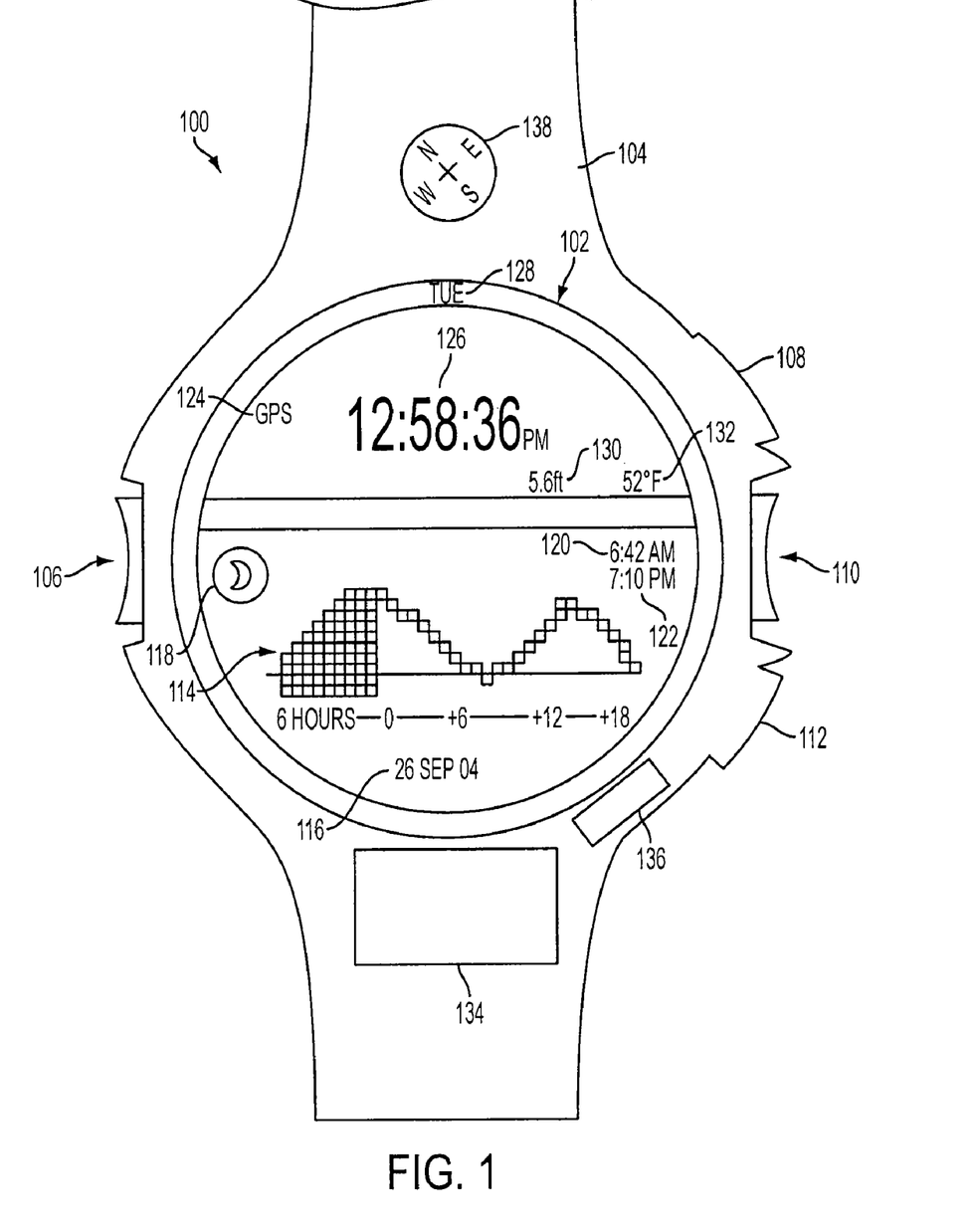
FIG. 1 is a top view of the tide display device according to an embodiment of the invention.

FIG. 1 is a top view of the tide display device 100 according to an embodiment of the invention. The tide display device 100 can be, for example, a watch, a surfing information device, a surf watch, a mobile device, a handheld device (e.g., a cell phone, a Blackberry or an iPhone), etc. Packaging the tide display device 100 in the form of a waterproof device provides the surfer with convenient and easy access to tide data. The tide display device 100 can also be packaged such that it can withstand various standard atmospheric pressures such as 3 atm, 5 atm, 7 atm, 10 atm, 15 atm, 20 atm, 25 atm, etc. This can be advantageous in preventing damage to the tide display device 100 from impact shock, water leakage, etc.

The tide display device 100 may be packaged in forms other than a watch. The tide display device 100 may also include Velcro®, clips, and/or suction devices for attaching the tide display device 100 to automobile dashboards, backpacks, bicycles, surf boards, etc. The tide display device 100 may also be embedded in other electronic devices such as a computer, a personal digital assistant or a cell phone.

The tide display device 100 may have a display 102, a band 104, first, second, third, and fourth push buttons 106, 108, 110, and 112, a GPS antenna 134, an RF antenna 136, and/or a compass 138. The RF antenna 136 can be used as a receiver, transmitter, and/or transceiver. The band 104 can be constructed of various materials such as cloth, polyurethane, etc. Thus, the band 104 can have a polyurethane unibody construction. An area surrounding the display 102 can be constructed of stainless steel while the display 102 can be made of a plastic or shatter resistant material.

The display 102 may show surf information such as a tide graph 114 having 24 hour tide information. The tide heights are shown chronologically from left to right. The abscissa (x-axis) of the tide graph 114 is labeled with time intervals.

The far left of the tide graph 114 shows the tide height six hours previously and the far right of the tide graph 114 shows the tide height eighteen hours in the future. Historic data on the tide graph 114 is shaded to allow the surfer to easily identify the current state of the tide in the tidal cycle. The date 116 appears below the tide graph. The surf information can also include a moon phase 118, which also appears proximate to the tide graph 114. Furthermore, surf information can also include a sunrise time 120 and a sunset time 122 that appear in the middle portion of the display 102.

The display 102 also has a GPS indication 124. The GPS indication 124 alerts the surfer that the information on the display 102 corresponds to the best available data for the GPS navigated location and time. The time of the day 126 and day of the week 128 may also be displayed. Since the GPS indication 124 is illuminated, the time of day corresponds to the GPS time of day. Also, displayed are the current tide height 130 and the temperature 132 as sensed by a temperature sensor 208 (shown in FIG. 2).

The display 102 layout is exemplary and many display pages are contemplated showing watch, GPS and tide information in a variety of formats. Alternate display pages may be selected through actuation of the push buttons 106, 108, 110, and 112. The push buttons 106, 108, 110, and 112 may be used to change the display format. For example, the tide information may be displayed numerically (e.g., spreadsheet), graphically with numerical labels (e.g., high and low tide numerics) or through animation.

The push buttons 106, 108, 110, and 112 may also be used to select different units of measure, for example, the tide height in meters or the temperature in degrees Celsius. The push buttons 106, 108, 110, and 112 may be used to set a tide alarm. The push buttons may be used to select the display language, for example, English, French, Chinese, Japanese, Portuguese, or Spanish. Display modes that allow the user to count waves or other events by depressing one of the push buttons 106, 108, 110, and 112 are provided. A heat timer mode can also be activated by depressing one of the push buttons 106, 108, 110, and 112. Furthermore, depressing one or more of the push buttons 106, 108, 110, and 112 can activate a chronograph feature of the tide display device 100.

The display 102 can also be used to display the time zones around the world with 24 time zones. A user can then view the current time in other time zones and/or shift the current time to a desired time zone.

Other display pages may display relevant surfing information for a variety of surf locations. A surfer may call up an individual location using push buttons 106, 108, 110, and 112. For each surf spot, the display may show the name of the location, the tide data (time and heights), and the sunset and sunrise times. Furthermore, in a "best mode" operation the display may also show the best tide for surfing, the best swell direction, the best wind direction, the bottom type or any other relevant surfing data. The bottom type may indicate the bottom of the body of water such as whether it is sand, rock, a mixture of sand and rock, or any other materials. In other modes, one or more of the relevant surfing data such as the name of the location, the tide data (time and heights), the sunset and sunrise times, the best tide for surfing, the best swell direction, the best wind direction, the bottom type may be displayed.

Using the push buttons 106, 108, 110, and 112, the surfer may also change or input the name of the beach. For example, a surfer may wish to change a reference beach name such as "Newport Beach" to "56$^{th}$ street" or "Secret Spot". Thus, although a beach may normally be referenced as "Newport Beach" the user can now customize the beach name to be "56$^{th}$ Street" or "Secret Spot." In that case, "56$^{th}$ Street" or "Secret Spot" will refer to "Newport Beach" and contain all of the same information as that of "Newport Beach." In one embodiment, the surfer may input a new beach name and a relative distance from an existing beach name. For example, the surfer may input Corona Del Mar Beach and 5 miles south of Newport Beach. Hence, the tide display device 100 is customizable to a particular location and will compute or estimate the new tide information (e.g., Corona Del Mar) relative to or using the stored tide information (e.g., Newport Beach). The push buttons 106, 108, 110, and 112 may allow the surfer to input or select a future calendar date and review tide or other surfing data for one or more locations on that date. Tide information for up to 2,000 spots and up to 50 years in the future can be stored in the tide display device 100.

The tide display device 100 also includes a tide alarm. Using push buttons 106, 108, 110, and 112, the surfer may select an alarm time relative to the tide time, for example, two hours before high tide. The alarm can also be set to indicate when there is a crescendo such as when the tide height is increasing or a decrescendo such as when the tide height is decreasing. The alarm can also be set to notify the user when the tide is at a certain height. In addition, the surfer may select an alarm tone or a display message to appear at the desired time. The surfer may also select a different alarm tone for high tide alert and low tide alert. The alarm tones can be a variety of sounds including, but not limited to, keytone, chimes, tide chimes, etc.

The push buttons 106, 108, 110, and 112 may also be used to change the tide graph 114 format, for example, 3 hours, 6 hours, 9 hours, 18 hours, 21 hours, and 24 hour format. The push buttons 106, 108, 110, and 112 may be used to view tide graphs 114 for previous days or future days. The push buttons 106, 108, 110, and 112 may be used to view tide graphs 114 for other geodetic positions or beaches. The push buttons 106, 108, 110, and 112 can also be used to lock the display such that the display does not accept any inputs from push buttons 106, 108, 110, and 112 until one of push buttons 106, 108, 110, and 112 are pushed to unlock the display. The push button 106, 108, 110, and 112 that locks and unlocks the display can be the same button or it can be different buttons. Furthermore, there can be a predetermined combination of push buttons 106, 108, 110, and 112 that locks and/or unlocks the display. Instead of locking the display, push buttons 106, 108, 110, and 122 can also be used to set the tide display device 100 into a sleep mode wherein the tide display device 100 will not wake from the sleep mode until one or more of push buttons 106, 108, 110, and 112 are depressed.

The push buttons 106, 108, 110, and 112 may be used to enter a tide time offset. The tide time offset may be used by the surfer to create a "new" beach not in the tidal database. The user may select a beach in the database, compare the high tide or low tide time of the selected beach with the new beach, and enter a tide time offset. The use of GPS to estimate a tide time offset from the surfer's present position to the nearest beach may be performed. The use of a math model for generating the tide graph 114 for a specific geodetic location based on tide information for one or more neighboring beaches may also be performed.

The tide display device 100 may also incorporate watch features such as alarms and timers. The tide display device 100 may also feature a compass 138 to allow the surfer to determine his orientation allowing the surfer to determine the swell or wind direction. The compass 138 can have a graphical layout and indicate north, south, west or east and the direction the user is pointing towards. The compass 138 can also have a graphical layout of the terrain that the user is at.

Furthermore, the compass 138 can also be incorporated onto the display 102 instead of being a separate unit. The compass 138 can have a digital display (e.g., graphically and/or numerically) or be digitally rendered onto the display 102.

The GPS antenna 134 located on the inside or outside of the tide display device 100 allows the electronics (not shown) to receive GPS signals. The use of a compact GPS antenna 134 is preferred to maintain the tide display device 100 form packaging.

Figure 2:
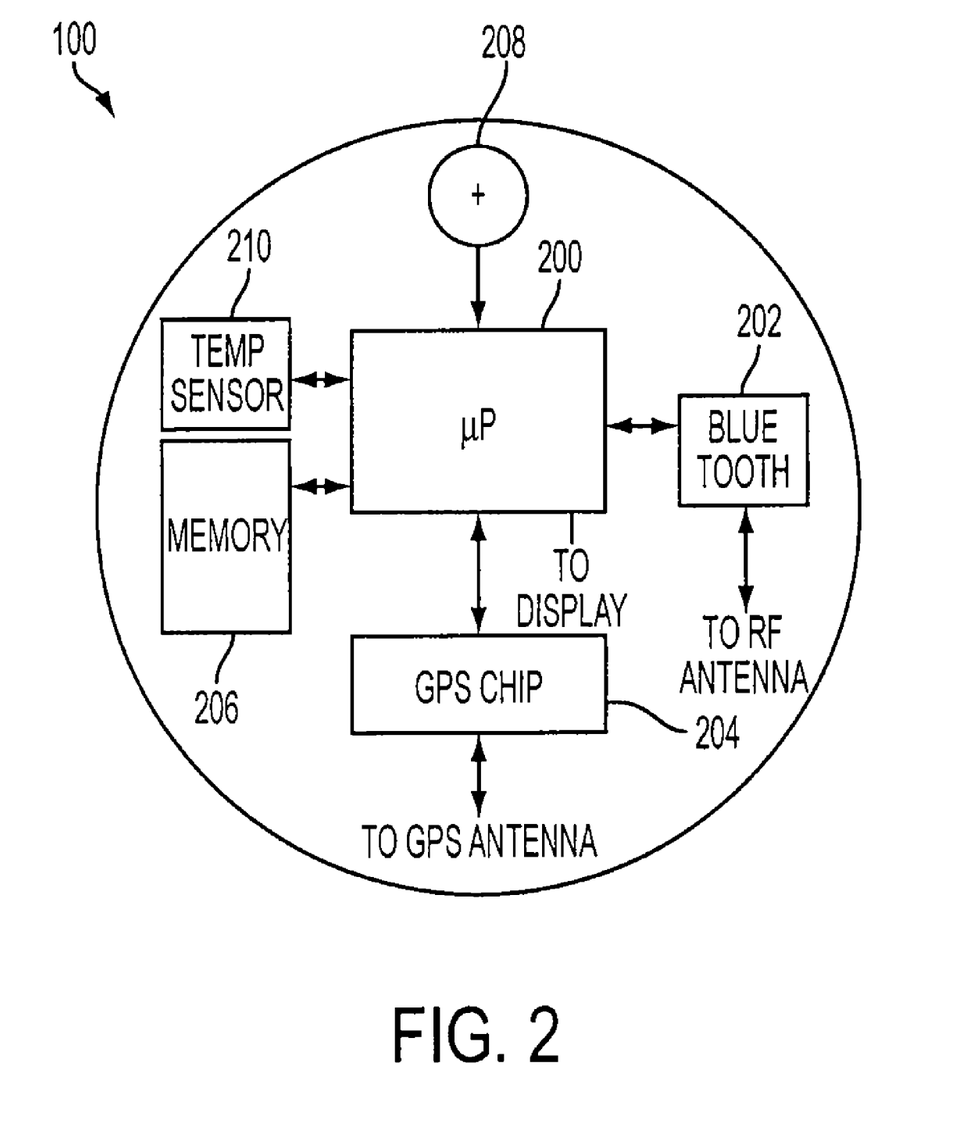
FIG. 2 is a cross section of the tide display device of FIG. 1 showing exemplary embedded electronic components according to an embodiment of the invention.

FIG. 2 is a cross section of the tide display device 100 of FIG. 1 showing exemplary embedded electronic components according to an embodiment of the invention. The tide display device 100 may include a microprocessor 200, a Bluetooth® Radio Frequency (RF) circuit 202, a GPS chip 204, a memory 206, a battery 208, and a temperature sensor 210. The Bluetooth® RF circuit 202 may be connected to the RF antenna 136 and the GPS chip 204 may be connected to the GPS antenna 134. Furthermore, the temperature sensor 210 can be connected to the microprocessor 200. The battery 208 provides power to each of the electronic components. To increase battery life, the microprocessor 200 can put the tide display device 100 into a sleep mode that reduces the amount of battery power used by the tide display device 100. The user can set the sleep time for a number of minutes, hours or days. Also, the user can set the tide display device 100 into a sleep mode until the user pushes one or more of the push buttons 106, 108, 110, and 112 to exit the sleep mode. The tide display device 100 can be stored for months and the battery life will be increased due to the sleep mode.

The GPS chip 204 may receive the GPS signals through the GPS antenna 134. The GPS chip 204 may process the GPS signals to determine the precise time and geodetic position of the tide display device 100. The GPS chip 204 may send the time and position to the microprocessor 200. The microprocessor 200 may process the time and position for display to the user.

The memory 206 may store a tide database as well as other information for use by the microprocessor 200. The memory 206 can store just the beaches the user wants such as beaches of interest to the user. This can limit the size of memory 206. For example, if there was only ten slots available in the memory 206, a user can load only 10 beaches it wants information about for one year into the memory 206. Alternatively, a user can load only 5 beaches it wants information about for two years into the memory 206. The number of slots available is variable and can be any number.

Furthermore, the display 102 can indicate how much of the memory 206 is available or used. For example, if two slots are used in the memory 206 and the memory 206 has ten slots total, then the display can indicate that eight slots are available, two slots are used, 20% of the memory 206 is full, and/or 80% of the memory 206 is empty, etc.

The memory 206 may also store GPS information serving as a GPS data logger. The GPS data logger can also contain, for example, user created mark-points. The user created mark-points can be used for future reference of the same GPS location. The memory 206 may be used to store ephemeredes, such as lunar phase or sunset or sunrise times. The memory 206 may also be used to store microprocessor programs or scripts. The memory 206 may also be used to store beach names that correspond with GPS information supplied by the GPS chip 204. For example, longitude and latitude GPS information of 33.47908, −117.718999 can be matched up with Salt Creek Beach Park in Dana Point, Calif. Likewise, longitude and latitude GPS information of 33.477004, −117.719493 can be matched up with the Huntington Beach Municipal Pier in Huntington Beach, Calif.

The Bluetooth® RF circuit 202 may provide the tide watch device 100 with RF capabilities. The Bluetooth® RF circuit 202 may be a Bluetooth® RF transceiver or a Bluetooth® RF transmitter or receiver. The Bluetooth® RF circuit 202 may be connected to a USB connection.

The microprocessor 200 may use the time and position information provided by the GPS chip 204 to update the display 102. For example, the microprocessor 200 may use the GPS time information to update the time of day 126 and the date 116 shown on the display 102. The microprocessor 200 may also use the GPS information to retrieve tide information and ephemeredes data from the memory 206 for updating the display 206. The microprocessor 200 may also perform area navigation, for example, calculating the distance and bearing to a beach by using GPS information of the current location and the GPS information of the beach.

The microprocessor 200 may also update databases in the memory 206. The microprocessor 200 may receive new databases via an RF data link established through the Bluetooth® RF circuit 202 or other wired or wireless means such as the Internet, mobile phone, wireless satellite transmissions, etc.

The temperature sensor 210 can sense a temperature and transmit it to the microprocessor 200. The microprocessor 200 can receive the temperature from the temperature sensor 210 and display the temperature on the display 102. The temperature can be displayed graphically and/or numerically (i.e., a digital readout). The temperature sensor 210 can be, for example, a digital thermometer, one or more comparators, one or more diodes, etc.

Figure 3:
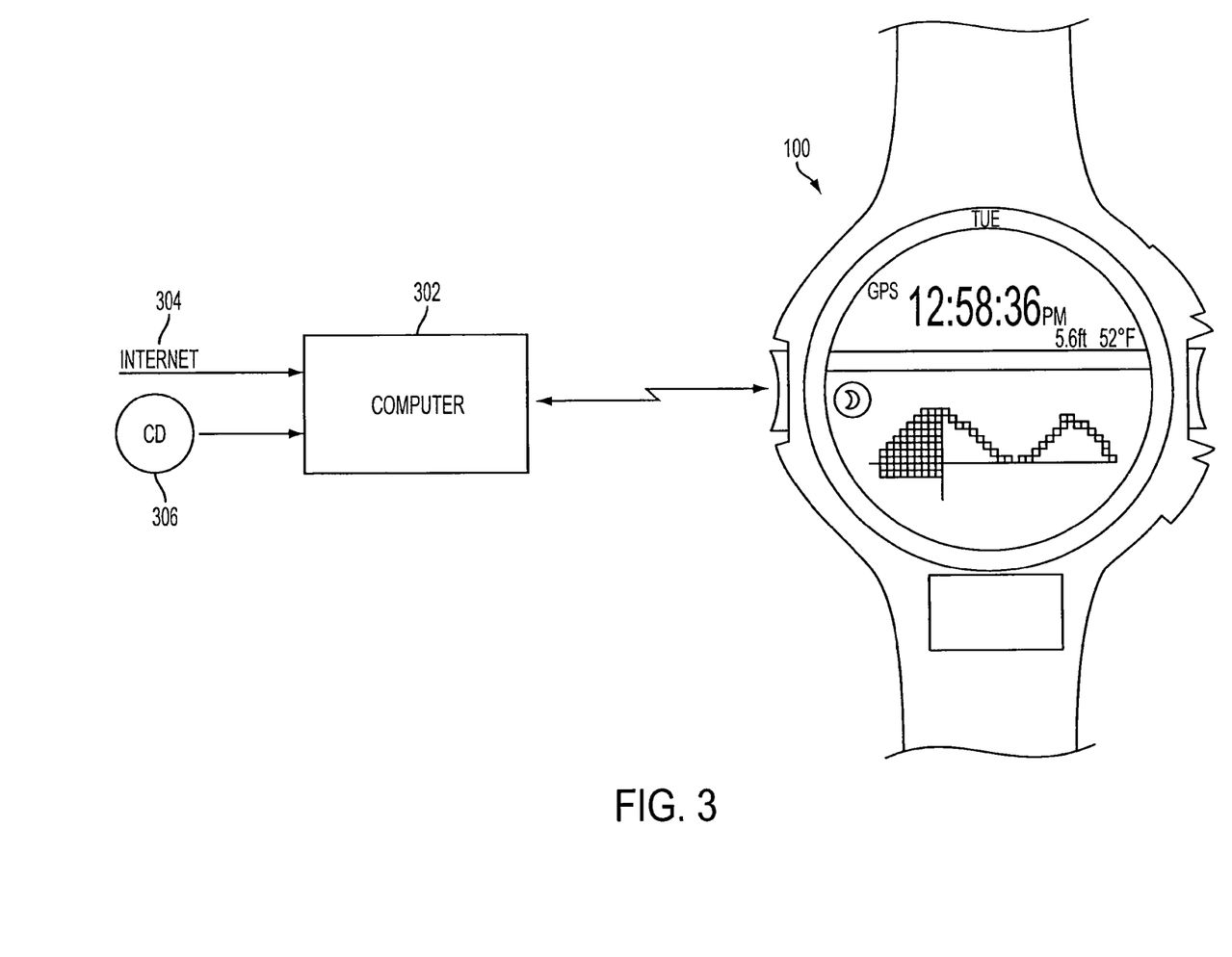
FIG. 3 is a diagram illustrating a computer with a tide database for uploading tide information to the tide display device of FIG. 1 according to an embodiment of the invention.

FIG. 3 is a diagram illustrating a computer 302 with a tide database for uploading tide information to the tide display device 100 of FIG. 1 according to an embodiment of the invention. Tide information as well as other information may be first loaded on the computer 302. The tide information may be loaded on the computer 302 via a data storage medium such as a CD 306, a universal serial bus (USB) connection, a FireWire® connection or a data transfer network such as the Internet 304. The tide information may be obtained from public databases such as those maintained by NOAA or a proprietary (private) database.

Instead of CD 306, the tide information can also be loaded onto a USB memory stick, a USB memory stick with Wi-Fi communication capability, a DVD, or any other type of data storage. The USB memory stick with Wi-Fi communication ability can directly communicate with the tide display device 100 using RF to load data onto the tide display device 100. The data storage can store, for example, tide data for 2000 spots and 50 years, or ephemeredes data for 2000 spots and 50 years. The data storage can also store images and/or videos of certain beaches which can be displayed on the computer 302. This can aid the user in selecting which beach the user wants to load onto the tide display device 100. The data storage can also store a world map that is zoomable such that a global map is first displayed but with predetermined actions the user can zoom in on the map and eventually view one or more pictures or videos of a specific beach.

The computer 302 can also cooperate with the memory 206 shown in FIG. 2 such that the computer 302 can display how much of the memory 206 is available or used.

The tide database may include non-tide data of interest to a surfer. For example, ephemeredes surf conditions, wind conditions, and swell information may be included. The tide database preferably contains tide data for all well known surfing beaches. For example, the database may contain tide data for The Wedge in Newport Beach and Huntington Pier in Huntington Beach. The tide conditions and times may be used by a surfer to determine the times when a specific surf spot is likely to have the best surfing conditions.

Once the databases are loaded on the computer 302, a surfer may select the database entries that should be loaded on the tide display device 100. For example, the surfer may be in Southern California and may wish to load the tide display device 100 with information for beaches from Big Sur to Ensenada. The surfer may establish a Bluetooth® link with the tide display device 100 and upload the relevant portions of the database to the tide display device 100. The relevant portions of the database can then be stored, for example, in the memory 206 of the tide display device 100.

Although a Bluetooth® wireless link between the tide display device 100 and the computer 302 is shown, other data wireless and cable data transfer methods may be used. For example, the tide display device 100 and the computer 302 may have a USB or FireWire® ports for data transfer. The memory 206 may also be removable allowing the surfer to remove and replace memory modules containing appropriate tide data. For example, the memory 206 can be a Secure Digital card, a Compact Flash card, or even a Flash EPROM memory. If the memory 206 is large enough, a large database may be preloaded by the manufacturer, making updating the memory 206 unnecessary. The large database may be preloaded by the manufacture onto the memory 206 and the memory 206 can receive updates that modify the large database.

The RF antenna 136 can also be used to download surf information such as beach and/or tide information from an external source such as an external database based on the GPS information supplied by the GPS chip 204. The external database can be a subscription based database. Thus, for example, even if the beach and/or tide information is not loaded on the memory 206, and the user is at a beach and not near a computer, the RF antenna 136 can access the beach and/or the tide information from an external database based on the GPS information supplied by the GPS chip 204. The beach and/or tide information can then be added to the memory 206.

Figure 4:
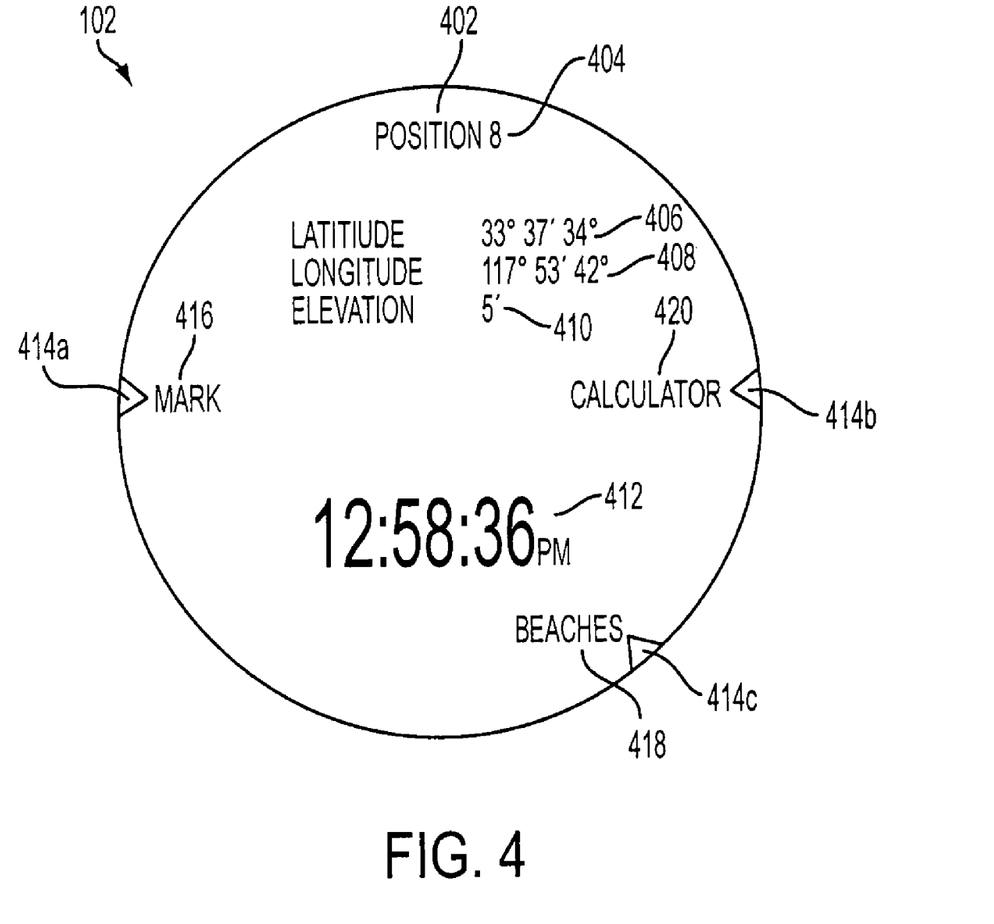
FIG. 4 shows an exemplary GPS page displayed on the tide display device of FIG. 1 according to an embodiment of the invention.

FIG. 4 shows an exemplary GPS page displayed on the tide display device 100 of FIG. 1 according to an embodiment of the invention. The display 102 may have a display page indicator 402 showing the surfer that he is currently viewing the "position" page. A satellite numeric 404 shows that the GPS chip 204 is using eight satellites to determine the tide watch device 100 geodetic position. Although eight satellites are generally used, a variety of satellites can be used such as two, three, four, five, six, seven, nine, ten, twenty-three, etc. The display 102 shows the geodetic position in latitude 406, longitude 408, and elevation 410 above mean sea level. The time 412 from one or more satellites may also be displayed.

Active push buttons may be designated by chevrons 414a and 414b. The display 102 has "mark" 416 with a chevron 414a next to the first push button 106 (see FIG. 1), indicating the surfer may mark his present position for later viewing by depressing the first push button 106. The display 102 also has "calculator" 420 with a chevron 414b next to the third push button 110 (see FIG. 1) indicating the surfer may select the calculator page by depressing the third push button 110. The display 102 also has "beaches" 418 with a chevron 414c next to the fourth push button 112 indicating the surfer may access the beaches page display by selecting the fourth push button 112.

Figure 5:
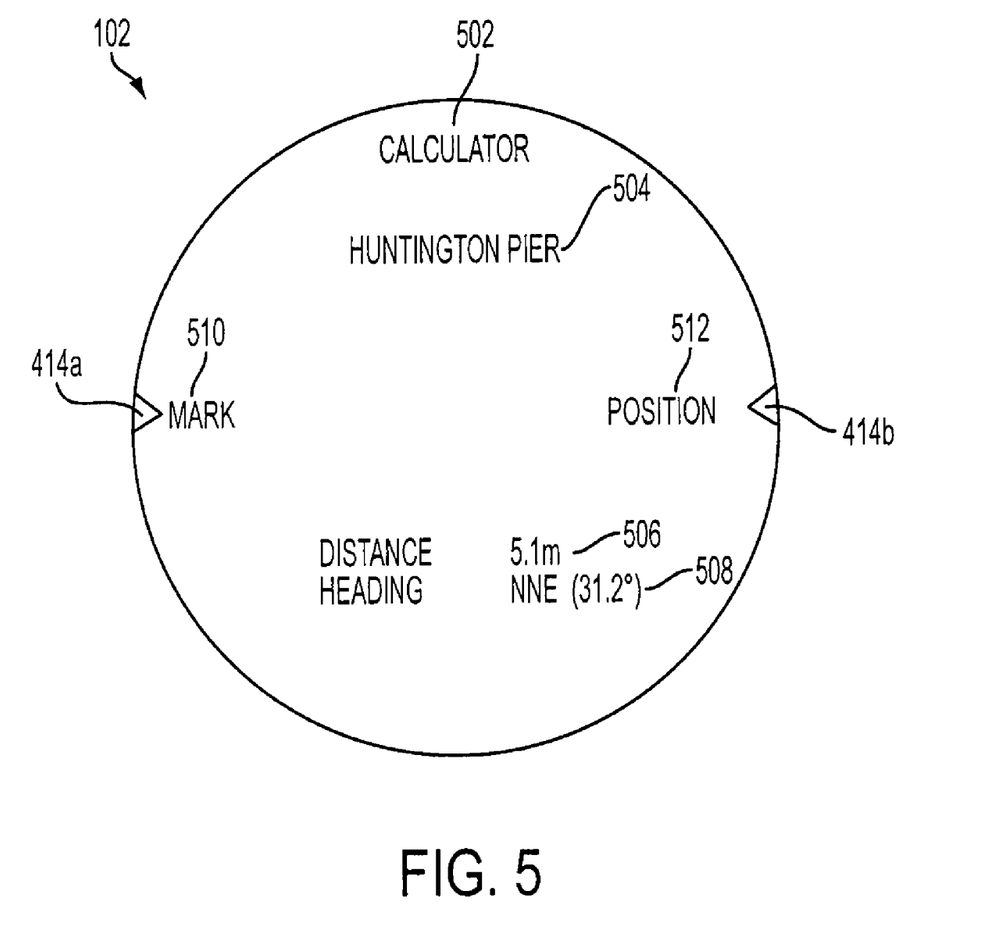
FIG. 5 shows an exemplary calculator page displayed on the tide display device of FIG. 1 according to an embodiment of the invention.

FIG. 5 shows an exemplary calculator page displayed on the tide display device of FIG. 1 according to an embodiment of the invention. The display 102 has a display page indicator 502 showing the surfer that he is currently viewing the "calculator" page. The location field 504 displays the closest beach for which tide information is available, e.g., Huntington Pier. The distance 506 and the bearing 508 to the tide information location are also displayed. In this case, the surfer knows that Huntington Pier is 5.1 miles to the north north east or a bearing of 31.2 degrees.

The display 102 has a chevron 414a with mark 510 next to the first push button 106 indicating the surfer may mark his present position for later viewing by depressing the first push button 106. The display 102 also has "position" 512 with a chevron 414b next to the third push button 110 indicating the surfer may access the position page display by selecting the third push button 110.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A tide display watch comprising:
   a waterproof housing;
   a memory located in the waterproof housing for storing tide information including a tide height and an associated time of day for each of a plurality of surf spots;
   a radio frequency transceiver located in the waterproof housing for downloading and updating the tide information;
   a global positioning system receiver located in the waterproof housing for determining geodetic position; and
   a display located in the waterproof housing, the display simultaneously displays a current time, a graph displaying tide heights on a vertical axis and time increments on a horizontal axis with a numeric labeling of the time increments on the horizontal axis, the graph including the tide height at the current time for the geodetic position, and an exact numeric value of the tide height separate from the tide heights on the vertical axis of the graph, the numeric value being continuously updated to represent the tide height at the current time for the geodetic position.

2. The tide display watch of claim 1 further comprising a global positioning system data logger having user created mark-points for logging global positioning system information.

3. The tide display watch of claim 1 wherein the display displays a latitude and a longitude.

4. The tide display watch of claim 1 wherein the display displays an elevation.

5. The tide display watch of claim 1 further comprising a temperature sensor for providing a temperature reading to the display.

6. The tide display watch of claim 1 wherein the display displays a sunset time and a sunrise time.

7. A surf information watch comprising:
   a waterproof housing;
   a memory located in the waterproof housing for storing tide information including a tide height and an associated time of day for each of a plurality of surf spots;

a microprocessor located in the waterproof housing having global position system software and generating global positioning system information;

a surf information database connected to the microprocessor;

a display connected to the microprocessor for displaying the global positioning system information from the microprocessor and surf information from the surf information database;

the display simultaneously displaying a current time, a graph displaying tide heights on a vertical axis and time increments on a horizontal axis with a numeric labeling of the time increments on the horizontal axis, the graph including the tide height at the current time for the geodetic position, and an exact numeric value of the tide height separate from the tide heights on the vertical axis of the graph, the numeric value being continuously updated to represent the tide height at the current time for the geodetic position; and a global positioning system data logger having user created mark-points for logging the global positioning system information.

8. The surf information watch of claim 7 wherein the surf information data includes tide information.

9. The surf information watch of claim 7 wherein the surf information data includes data on ephemeredes.

10. The surf information watch of claim 9 wherein the data on ephemeredes includes data on a moon phase.

11. The surf information watch of claim 9 wherein the data on ephemeredes includes data on a sunset and a sunrise.

12. The surf information watch of claim 7 further comprising a temperature sensor coupled with the microprocessor for measuring a temperature of the environment, the display displays the temperature measured by the temperature sensor.

13. A tide display watch comprising:
a waterproof housing;
a memory located in the waterproof housing for storing tide information including a tide height and an associated time of day for each of a plurality of surf spots;
a radio frequency transceiver located in the waterproof housing for downloading and updating the tide information;
a global positioning system receiver located in the waterproof housing for determining geodetic positions;
a global positioning system data logger storing user created mark-points for logging the geodetic positions;
a temperature sensor for providing a temperature reading;
a display located in the waterproof housing operable to display the tide information for the geodetic positions, the user created mark-points, and the temperature reading;
the display simultaneously displays a current time, a graph displaying tide heights on a vertical axis and time increments on a horizontal axis with a numeric labeling of the time increments on the horizontal axis, the graph including the tide height at the current time for the geodetic position, and an exact numeric value of the tide height separate from the tide heights on the vertical axis of the graph, the numeric value being continuously updated to represent the tide height at the current time for the geodetic position.

14. The tide display watch of claim 13 wherein the display displays an elevation.

\* \* \* \* \*